Figure 1:
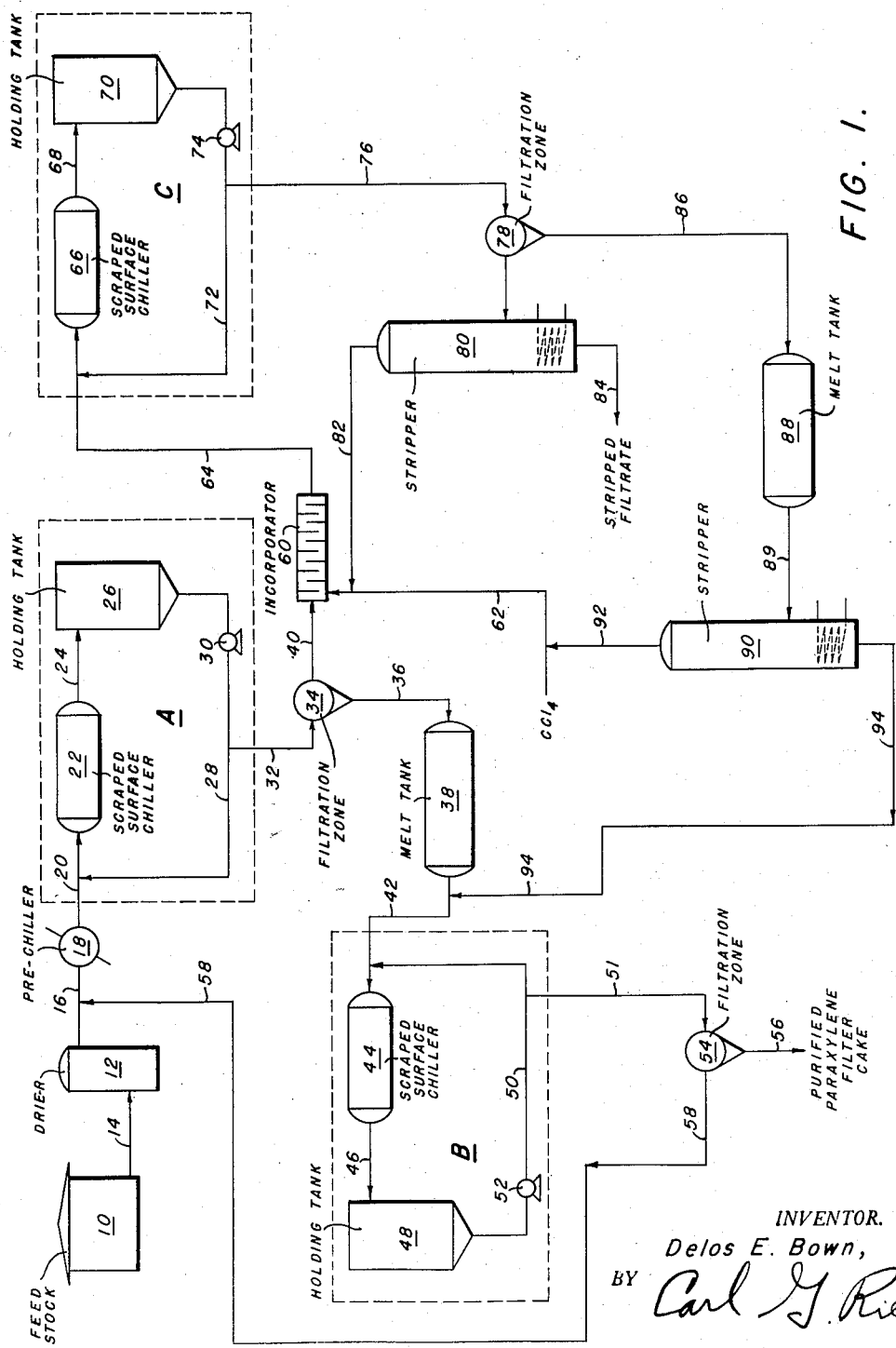

Aug. 12, 1958 D. E. BOWN 2,847,486
CRYSTALLIZATION OF PARAMETHYL AROMATIC COMPOUNDS
EMPLOYING CARBON TETRACHLORIDE FOR FURTHER
RECOVERY OF PARAMETHYL COMPOUND
Filed Sept. 19, 1955 2 Sheets-Sheet 1

INVENTOR.
Delos E. Bown,
BY
ATTORNEY.

Aug. 12, 1958 D. E. BOWN 2,847,486
CRYSTALLIZATION OF PARAMETHYL AROMATIC COMPOUNDS
EMPLOYING CARBON TETRACHLORIDE FOR FURTHER
RECOVERY OF PARAMETHYL COMPOUND
Filed Sept. 19, 1955 2 Sheets-Sheet 2

INVENTOR.
Delos E. Bown,
BY
ATTORNEY

United States Patent Office 2,847,486
Patented Aug. 12, 1958

2,847,486

CRYSTALLIZATION OF PARAMETHYL AROMATIC COMPOUNDS EMPLOYING CARBON TETRACHLORIDE FOR FURTHER RECOVERY OF PARAMETHYL COMPOUND

Delos E. Bown, Baytown, Tex., assignor, by mesne assignments, to Esso Research and Engineering Company, Elizabeth, N. J., a corporation of Delaware Application September 19, 1955, Serial No. 535,020

12 Claims. (Cl. 260—674)

This invention relates to a selective crystallization process for recovering polymethyl aromatic compounds containing paradimethyl groupings, such compounds being hereinafter referred to as paramethyl aromatic compounds. More particularly, this invention relates to an improved process for the fractional crystallization and filtration recovery of paramethyl aromatic compounds wherein paramethyl aromatic compound filtrate loss is minimized.

The invention may briefly be described as the process of chilling a feed stock comprising a mixture of closely boiling aromatic hydrocarbons containing a paramethyl aromatic hydrocarbon to about the lowermost temperature of selective crystallization of the paramethyl aromatic compound to form a first slurry of paramethyl aromatic compound crystals in a first mother liquor, filtering the first slurry to obtain a first filter cake and a first filtrate containing uncrystallized paramethyl aromatic compound, mixing about 20 to 45 weight percent of carbon tetrachloride with said first filtrate, chilling the thus formed mixture to about the temperature of said first slurry to form a second slurry of a crystallized complex of paramethyl aromatic compound and carbon tetrachloride in a second mother liquor, filtering said second slurry to obtain a second filter cake comprising said crystalline complex, removing carbon tetrachloride from the thus obtained second filter cake and recovering the first filter cake and the carbon tetrachloride-freed second filter cake as products.

When a fractional crystallization and recovery process is employed for the recovery of a paramethyl aromatic compound from an aromatic feed stock containing the same, it is conventional practice to chill the aromatic feed stock to form a slurry of crystals of such compound in a mother liquor. The mother liquor will normally contain at least a portion of the paramethyl aromatic compound in uncrystallized form; the amount of uncrystallized paramethyl compound in the mother liquor being minimized when the feed stock is chilled to about the lowermost temperature of selective crystallization (i. e., to within about 10° F. of the temperature at which crystalline eutectics with other components of the feed stock commence to form). The thus formed slurry is then filtered to obtain a filter cake fraction containing crystallized paramethyl aromatic compound and a mother liquor filtrate fraction containing uncrystallized paramethyl aromatic compound. The uncrystallized paramethyl aromatic compound in the filtrate will normally be lost to the process in that recycle, per se, of a filtrate obtained at about the lowermost temperature of crystallization will not result in the recovery of the uncrystallized paramethyl aromatic compound contained therein.

Representative paramethyl aromatic compounds that may be recovered by the process of the present invention include paraxylene, duerene, pseudocumene (1, 2, 4 trimethyl benzene), etc. The feed stocks to be employed in accordance with the present invention are mixtures of closely boiling cyclic hydrocarbon compounds, at least one of the compounds in the mixture being a polymethyl aromatic compound containing a paramethyl grouping. Representative examples of such feed stocks include mixtures of isomeric ortho-, meta-, and paraxylene containing about 10 to 25 weight percent of paraxylene, aromatic hydrocarbon fractions boiling between about 365° and 425° F. and containing about 5 to 20 weight percent of durene (1, 2, 4, 5, tetramethyl benzene), etc.

The feed stock is chilled to about the lowermost temperature of selective crystallization of the paramethyl compound to be used. Normally, this temperature will be within the range of about —50° to about —110° F., the particular temperature to be employed being dependent on the composition of the feed stock and, particularly, upon the presence of aromatic compounds capable of forming crystalline eutectics with the paramethyl aromatic compound. For example, paraxylene and orthoxylene will form a crystalline eutectic at a temperature of about —110° F.

The thus-formed slurry is filtered to obtain a first filter cake fraction and a first filtrate fraction. The first filter cake will normally comprise at least about 60 weight percent of paramethyl aromatic compound (e. g. about 60 to 85 weight percent) and may be recovered as product. However, if a greater product purity is required, the first filter cake may be further processed in any suitable manner (e. g. in a manner to be described) in order to obtain a high purity paramethyl aromatic product.

In accordance with the present invention, the first filtrate is admixed with about 20 to 45 weight percent of carbon tetrachloride and the resultant mixture is chilled to about the temperature of the first mentioned slurry to form a second slurry of crystalline paraxylene-carbon tetrachloride complex in a mother liquor containing paraxylene and carbon tetrachloride in uncrystallized form. The second slurry is filtered to provide a second filter cake and second filtrate. The second filter cake is treated in any suitable manner in order to remove the carbon tetrachloride therefrom whereby there is obtainable a carbon-tetrachloride free second product which will normally contain about 60 weight percent or more of paramethyl compound (e. g. about 60 to 85 weight percent). This product may likewise be further treated, if desired, in order to increase the purity thereof.

When the first stage filter cake and the carbon tetrachloride free second stage filter cake are to be purified, a further selective crystallization step may be employed in order to accomplish the desired purification. Thus, for example, the first stage filter cake may be melted and admixed with the melted carbon tetrachloride free second stage product to form a charge mixture which is chilled to a temperature sufficient to crystallize the paramethyl aromatic compound contained in the charge mixture. In this instance, however, in order to obtain a high purity product, the charge mixture is preferably chilled to about the uppermost temperature of selective crystallization of the paramethyl compound (i. e. to a temperature not less than about 40° F. lower than the temperature of which the paramethyl compound begins to crystallize) whereby a slurry is obtained containing crystallized paramethyl aromatic compound in a mother liquor rich in paramethyl aromatic compound and containing, for example, about 40 to 60 weight percent of uncrystallized paramethyl compound. On filtration of this slurry a filter cake is obtainable containing at least about 95 weight percent of paramethyl aromatic compound. A filtrate rich in paramethyl compound is obtainable which may be recycled to the first stage.

Figure 2:
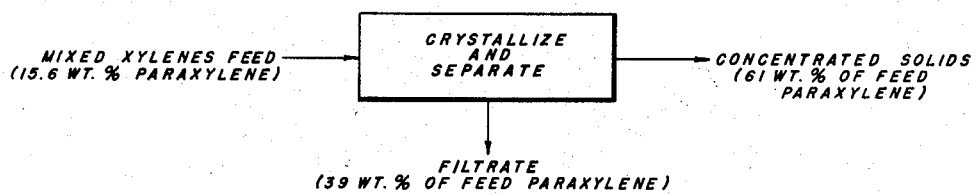
Figure 3:
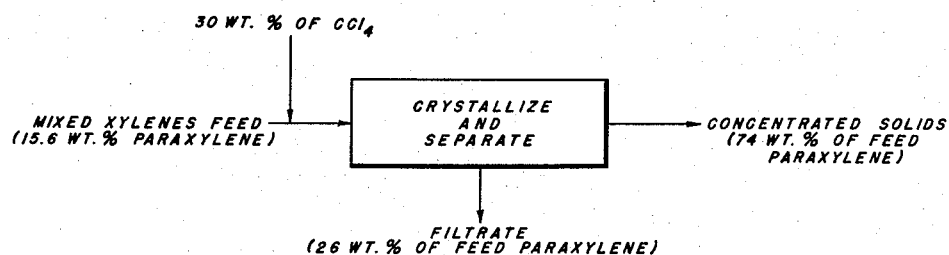
Figure 4:
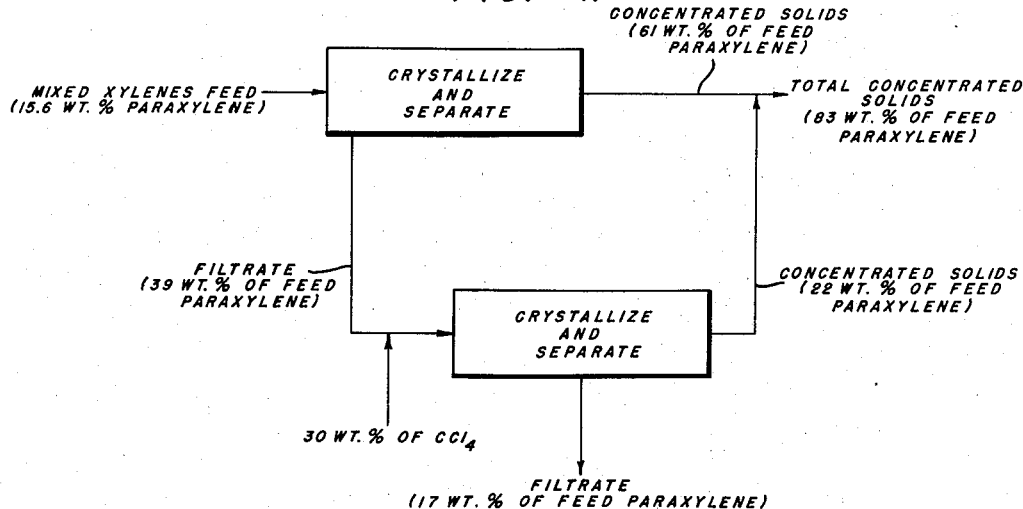

The process of the present invention will now be described in conjunction with the accompanying drawings wherein:

Fig. 1 is a schematic simplified flow diagram illustrating one mode for practicing the process of the present invention; and Figs. 2 to 4 are schematic flow charts illustrating the yields obtainable when a paramethyl aromatic compound containing feed stock is processed under a variety of operating conditions.

Turning now to Fig. 1, the letter "A" designates the first stage of a multi-stage fractional crystallization process for the formation and recovery of a filter cake comprising a partially purified paramethyl aromatic compound, the letter "B" designates a second stage wherein the first stage filter cake is treated for further purification and the letter "C" designates an intermediate stage wherein paramethyl compound is recovered from a filtrate derived from the first stage "A." For convenience, the process of Fig. 1 will be described with respect to the recovery of paraxylene from a feed stock comprising a mixture of isomeric xylenes, and containing 10 to 25 weight percent of paraxylene. It will be understood, however, that the process is equally applicable for the recovery of other paramethyl aromatic compounds such as durene, pseudocumene, etc. from other cyclic hydrocarbon feed stocks.

In Fig. 1 there is disclosed a feed stock tank 10 containing a feed stock comprising, for example, a mixture of isomeric xylenes containing, about 10 to 25 weight percent of paraxylene. Feed stock from the storage tank 10 is delivered to a suitable drier 12 by means of a line 14 for the removal of any residual amounts of water that may be contained therein. From the drier 12 the feed stock is passed by way of a line 16 through a pre-chiller 18 wherein the feed stock is chilled to a temperature just above the temperature of crystallization of the paramethyl aromatic compound. In the case of paraxylene, the feed stock may be pre-chilled to a temperature in the range of about −40° to about −60° F.

If desired, the feed stock may be mixed with about 5 to 10 weight percent of a paraxylene rich recycle stream derived in a manner to be set forth and charged to the feed stock through a recycle line 58.

The thus chilled feed material is passed from the pre-chiller 18 through a line 20 where it may be mixed with a recycle stream of crystalline paraxylene slurry in a manner to be described and thence to a scraped surface chiller 22 of any suitable construction wherein the mixture is brought to about the lowermost temperature of selective crystallization to be used which, in the case of paraxylene, is in the range of about −90° to about −105° F. Preferably, a temperature of about −95° F. is employed.

Within the scraped surface chiller 22 at least a portion of the paraxylene contained in the feed stock is crystallized to form a first stage slurry containing, for example, about 5 to 10 volume percent of paraxylene crystals in a mother liquor containing uncrystallized paraxylene. The first stage slurry is passed from the scraped surface chiller 22 through a line 24 to a holding tank 26 wherein the first stage slurry is preferably held for an average residence time of about 0.5 to 4 hours to promote crystal growth. Slurry in the holding tank 26 is maintained at a temperature of about −90° to −105° F. by recycling a portion of the slurry through a recycle line 28 containing a pump 30, the recycle line 28 leading to the charge line 20 for the scraped surface chiller 22. For example, about 10 volumes of slurry per volume of fresh feed may be recycled.

In Fig. 1, the first stage A has been shown as comprising a single scraped surface chiller-holding tank unit. It will be understood that, if desired, a plurality of such scraped surface chiller-holding tank units may be utilized in series, with the last unit in the series being operated at about the lowermost temperature of selective crystallization.

A portion of the first stage slurry passing through the recycle line 28 is withdrawn therefrom through a discharge line 32 leading to a first stage filtration zone 34 comprising suitable means, such as a basket type centrifuge, for filtering the first stage slurry in order to form a first stage filter cake of partially purified paraxylene crystals containing, for example, about 70 to 80 weight percent of paraxylene and a first stage filtrate containing, for example, about 5 to 10 weight percent of uncrystallized paraxylene. The first stage filter cake is discharged from the filtration zone 34 through a conduit 36 to a melt tank 38 and the first stage filtrate is discharged through a line 40.

The first stage filter cake of partially purified paraxylene is liquefied in the melt tank 38 and then passed to the second stage B through a line 42 leading to a scraped surface chiller 44. An additional amount of a paraxylene-containing charge, derived in accordance with the present invention in a manner to be explained, is charged to the line 42 through a line 94 for admixture with the first stage melt and for purification in the second stage B. In the scraped surface chiller 44 the temperature of the charge mixture is reduced to a temperature within the range of about −20° to +20° F. and preferably to a temperature of about 0° F. to form a second stage slurry of paraxylene crystals in a mother liquor rich in paraxylene. From the scraped surface chiller 44 second stage slurry is passed through a line 46 to a second stage holding tank 48 wherein it is preferably maintained for an average residence time of at least about 30 minutes. The temperature of the slurry in the second stage holding tank 48 is maintained by recycling a stream of slurry through a recycle line 50 containing a pump 52 through a line 42 leading to the second stage scraped surface chiller 44. Again, the rate of feed and rate of recycle may be correlated to provide for a charge mixture of about 10 volumes of recycle slurry per volume of feed mixture to the scraped surface chiller 44.

A portion of the second stage slurry is withdrawn from the recycle line 50 through a line 51 leading to a second stage filtration zone 54 comprising suitable means, such as a basket type centrifuge, wherein the second stage slurry is filtered to provide a filter cake of paraxylene crystals containing about 95 weight percent or more of paraxylene and to provide a second stage filtrate rich in uncrystallized paraxylene and containing, for example, about 40 to 60 weight percent of paraxylene. The thus obtained second stage filter cake is discharged from the filtration zone 54 through a conduit 56 as product. The second stage filtrate is discharged from the filtration zone 54 to a line 58 for recycle to the line 16 for admixture with fresh feed stock charged to the pre-chiller 18, as described.

Returning now to the first stage filtration zone 34 and the first stage filtrate discharged therefrom through the line 40, there is provided in accordance with the present invention suitable means for admixing the first stage filtrate with about 20 to 45 percent by weight of carbon tetrachloride. One manner in which this may be accomplished is through the provision of an incorporator 60 of any suitable construction to which carbon tetrachloride is charged from a suitable source (not shown) by way of the line 62. The first stage filtrate and carbon tetrachloride are mixed in the incorporator 60 and then passed by way of a line 64 to the intermediate stage C; the mixture of carbon tetrachloride and first stage filtrate passing first through a suitable scraped surface chiller 66 and thence, by way of the line 68 to an intermediate stage holding tank 70. The mixture charged to the scraped surface chiller 66 is preferably chilled therein to a temperature of about −90° to −105° F. and the slurry charged to the holding tank 70 by way of the line 68 is preferably maintained therein for an average residence time of about 0.5 to 4 hours. A crystalline complex of carbon tetrachloride and paraxylene is formed when the mixture of carbon tetrachloride and first stage filtrate is chilled to a temperature of about −90° to −105° F. in the intermediate stage scraped surface chiller 66. The thus formed slurry of paraxylene-carbon tetrachloride crystals in a mother liquor containing uncrystallized paraxylene and carbon tetrachloride is maintained at the indicated temperature in the intermediate stage holding tank 70 by recycling a stream of the intermediate slurry through a recycle line 72 containing a pump 74, the recycle line 72 discharged into the line 64 leading to the intermediate stage scraped surface chiller 66. Thus, for example, a mixture of about 10 volumes of slurry per volume of charge may be passed through the scraped surface chiller 66.

A portion of the recycled intermediate stage slurry is withdrawn from the recycle line 72 through a line 76 and passed to an intermediate filtration zone 78 wherein suitable means, such as a basket type centrifuge, is provided for forming an intermediate stage filter cake of the crystalline paraxylene-carbon tetrachloride complex and an intermediate stage filtrate containing uncrystallized paraxylene and carbon tetrachloride. The intermediate stage filtrate is passed to a suitable stripping zone 80 comprising, for example, a suitable distillation column, wherein the carbon tetrachloride is stripped from the intermediate stage filtrate for overhead discharge through the line 82 for recycle to the carbon tetrachloride charge line 62 leading to the incorporator 60. The stripped intermediate stage filtrate is discharged from the zone 80 through a bottoms discharge line 84 for discard from the system.

The filter cake of crystalline paraxylene-carbon tetrachloride complex is delivered from the filtration zone 78 through a conduit 86 to a melt tank 88 for liquefaction and the thus-obtained intermediate stage melt is delivered to suitable fractionating means 90 such as a distillation column, through a charge line 89. Carbon tetrachloride is stripped from the melt in the stripper 90 and discharged therefrom overhead through a line 92 for recycle to the carbon tetrachloride charge line 62 leading to the incorporator 60. The stripped intermediate stage melt is discharged from the stripper 90 through the bottoms line 94 and delivered to the line 42 leading to the scraped surface chiller 44 and therein mixed with the melt obtained by liquefaction of the partially purified first stage paraxylene filter cake.

By way of illustration, the present invention is particularly suitable for recovering a maximized yield of paraxylene from a paraxylene-containing feed stock such as a feed stock containing ortho-, meta-, and paraxylene and other $C_8$ aromatic hydrocarbons from which paraxylene is separated only with difficulty because of the relatively small difference in volatility for the components comprising the feed stock. Typical feed stocks of this nature may have a composition as follows:

TABLE I

| Analysis, Wt. Percent | Feed Stock "A" | Feed Stock "B" |
|---|---|---|
| Toluene | 2.3 | 2.7 |
| Ethylbenzene | 17.6 | 21.0 |
| Paraxylene | 15.5 | 18.1 |
| Metaxylene | 40.0 | 46.4 |
| Orthoxylene | 20.3 | 11.0 |
| $C_9$ Aromatics | 3.0 | |
| Non-Aromatics | 1.3 | 0.8 |

EXAMPLE 1

A first portion of a paraxylene-containing feed stock having the composition set forth in Table I (Feed Stock A) was chilled to a temperature of about −95° F. to form a slurry. The slurry was filtered and paraxylene was recovered and the yield determined. To second, third, fourth and fifth portions of the feed stock there was added 20, 30, 40 and 50 weight percent, respectively, of carbon tetrachloride. The mixtures were chilled to about −95° F. to form slurries of paraxylene-carbon tetrachloride crystals in a mother liquor. The slurries were filtered, paraxylene was recovered and the yields of paraxylene were determined. Sixth, seventh, eighth and ninth portions of the feed stock were chilled without dilution to form slurries which were filtered. Paraxylene was recovered and the yield determined. In addition, 20, 30, 40 and 50 weight percent, respectively, of carbon tetrachloride, was added to the sixth, seventh, eighth and ninth filtrates and the resultant mixtures were then chilled to a temperature of about −95° F. to form slurries of crystalline paraxylene-carbon tetrachloride complex in the respective mother liquors. The thus formed slurries were filtered and paraxylene was recovered. Yields for the sixth, seventh, eighth and ninth portions were determined on the combined basis of paraxylene recovered from the slurry of undiluted feed stock and paraxylene recovered from the slurry of filtrate-carbon tetrachloride mixture. The results are set forth in Tables II and III.

TABLE II

*Amount of paraxylene recovered by crystallization of feed stock containing 15.6 weight percent of paraxylene at −95° F.*

| Portion | Amount of $CCl_4$ Added to Feed Stock, Weight Percent | Amount of $CCl_4$ Added to Filtrate, Weight Percent | Amount of Paraxylene Recovered, Based on Feed Stock, Weight Percent |
|---|---|---|---|
| 1 | 0 | 0 | 9.5 |
| 2 | 20 | 0 | 10.5 |
| 3 | 30 | 0 | 11.5 |
| 4 | 40 | 0 | 12.1 |
| 5 | 50 | 0 | 13.0 |
| 6 | 0 | 20 | 11.6 |
| 7 | 0 | 30 | 12.9 |
| 8 | 0 | 40 | 13.5 |
| 9 | 0 | 50 | 13.7 |

TABLE III

*Comparison of paraxylene yields of portions 2 to 9 on the basis of added $CCl_4$*

| 1 | 2 | 3 | 4 | 5 | 6 |
|---|---|---|---|---|---|
| Amount of $CCl_4$ Added | Portion (Feed Stock Addition) | Yield, wt. Percent | Portion (Filtrate Addition) | Yield, wt. Percent | Increase in Yield (Col. 5—Col. 3), wt. Percent |
| 20 wt. percent | 2 | 10.5 | 6 | 11.6 | +1.1 |
| 30 wt. percent | 3 | 11.5 | 7 | 12.9 | +1.4 |
| 40 wt. percent | 4 | 12.1 | 8 | 13.5 | +1.4 |
| 50 wt. percent | 5 | 13.0 | 9 | 13.7 | +0.7 |

From Table II it will be seen that with respect to the first portion, a yield of about 9.5 weight percent of paraxylene was obtained in the absence of added carbon tetrachloride, that the yield was increased when carbon tetrachloride was added to the feed stock, as shown by portions 2 to 5, but that a significantly greater yield was obtained when operating in accordance with the present invention (portions 6 to 9) wherein the paraxylene was recovered from the feed stock without carbon tetrachloride addition and wherein carbon tetrachloride was added to the filtrate to obtain a further recovery of paraxylene.

The increase in yield that is obtainable in accordance with the present invention is more clearly set forth in Table III wherein a comparison is made with respect to portions 2 to 9 on the basis of added carbon tetrachloride. With reference to column 6 of Table III, it will be seen that in each instance there was obtained a significant increase in yield with carbon tetrachloride filtrate addition as compared with the yield obtainable by adding the same amount of carbon tetrachloride to the feed stock.

It will also be noted that carbon tetrachloride additions of 40 and 50 weight percent resulted in about the same yield of product (column 4, pages 8 and 9), thus showing that it is desirable to use not more than 45 weight percent of carbon tetrachloride for the filtrate addition.

The effect on yield of carbon tetrachloride addition is also schematically set forth in Figs. 2 to 4 wherein the yield of paraxylene from a mixed xylenes feed stock containing 15.6 weight percent of paraxylene is set forth on a weight percentage basis. From Fig. 2 it will be seen that when the feed stock is crystallized and separated without carbon tetrachloride addition, about 61 weight percent of the paraxylene initially present in the feed stock is recovered and that about 39 weight percent of the paraxylene is discarded with the filtrate.

With reference to Fig. 3 it is seen that when about 30 volume percent of carbon tetrachloride is added to the feed stock the yield is increased to about 73 weight percent and the filtrate loss is reduced to about 27 weight percent.

When operating in accordance with the present invention, as schematically shown in Fig. 4, it will be noted that a total yield of 83 weight percent of paraxylene is obtainable when about 30 weight percent of carbon tetrachloride is added to the filtrate obtained by the crystallization and separation of the paraxylene feed stock in the absence of added carbon tetrachloride. It is further to be noted that the filtrate loss in this instance is only 17 weight percent of paraxylene, based on the feed stock.

Equally satisfactory results are obtainable with aromatic feed stocks containing other paramethyl aromatic compounds. For example, an aromatic hydrocarbon fraction boiling between about 365° and 425° F. and containing about 10 volume percent of durene may be chilled to a temperature in the range of about −50° to about −90° F. to give a slurry containing about 6 weight percent of durene crystals. When operating in accordance with the process diagrammatically illustrated in Fig. 1, a first stage filter cake is obtained containing about 70 weight percent of durene and a second stage filter cake is obtainable containing about 95 weight percent or more of durene, the second stage filter cake being obtained by processing of the combined first stage and intermediate stage filter cakes in the described manner in the range of about +90° to about 110° F.

Having thus described my invention, what I claim is:

1. In a process for the recovery of a polymethyl $C_8$ to $C_{10}$ benzene containing a paramethyl grouping from an aromatic hydrocarbon feed stock containing the same in admixture with closely boiling aromatic compounds and wherein the feed stock is chilled to about the lowermost temperature of selective crystallization of said paramethyl aromatic compound to form a first slurry which is filtered to provide a first filter cake fraction and a first filtrate fraction, the improvement which comprises mixing said first filtrate fraction with about 20 to 45 weight percent of carbon tetrachloride, chilling said mixture to about the temperature of said first slurry to form a second slurry containing a crystalline complex of said carbon tetrachloride with said paramethyl compound in a second mother liquor, filtering said second slurry to obtain a second filter cake and stripping carbon tetrachloride from said second filter cake.

2. A process as in claim 1 wherein the paramethyl aromatic compound is paraxylene.

3. A process as in claim 1 wherein the paramethyl aromatic compound is durene.

4. A process as in claim 1 wherein the paramethyl aromatic compound is pseudocumene.

5. A process for recovering a polymethyl $C_8$ to $C_{10}$ benzene containing a paramethyl grouping from a feed stock containing said compound in admixture with closely boiling aromatic compounds which comprises the steps of chilling said feed stock to about the lowermost temperature of selective crystallization of said paramethyl aromatic compound to form a first slurry, filtering said first slurry to obtain a filter cake comprising partially purified paramethyl aromatic compound and a first filtrate fraction containing uncrystallized paramethyl aromatic compound, mixing said first filtrate with about 20 to 45 weight percent of carbon tetrachloride, chilling said mixture to about the temperature of said first slurry to form a second slurry, filtering said second slurry to obtain a second filter cake comprising a crystalline complex of said carbon tetrachloride with said paramethyl compound and a second filtrate, melting said second filter cake, recovering paramethyl compound from said melt, melting said first filter cake, mixing said melts, chilling said melts to about the uppermost temperature of crystallization of said paramethyl compound to obtain a third slurry, and filtering said third slurry to provide a third filter cake containing at least about 95 weight percent of said paramethyl compound.

6. In a process for the recovery of paraxylene from an aromatic hydrocarbon feed stock containing the same wherein the feed stock is chilled to a temperature of about −90° to −105° F. in a first stage to provide a first stage slurry of paraxylene crystals in a paraxylene containing mother liquor, wherein the first stage slurry is filtered to provide a partially purified paraxylene filter cake and a first stage-paraxylene containing filtrate, the improvement for obtaining a further yield of paraxylene which comprises the steps of mixing about 20 to 45 weight percent of carbon tetrachloride with the first stage filtrate, chilling the thus formed mixture to a temperature of about −90° to −105° F. to form an intermediate slurry of crystalline paraxylene-carbon tetrachloride complex in a carbon tetrachloride containing mother liquor, filtering the intermediate stage filter cake of crystalline paraxylene-carbon tetrachloride complex, melting the thus obtained intermediate stage filter cake and removing carbon tetrachloride from the thus obtained melt.

7. A process as in claim 6 wherein the feed stock is chilled to a temperature of about −95° F. and wherein the intermediate stage slurry is chilled to a temperature of about −95° F.

8. In a process for the recovery of paraxylene from an aromatic hydrocarbon feed stock containing the same wherein the feed stock is chilled to a temperature of about −90° to −105° F. in a first stage to provide a first stage slurry of paraxylene crystals in a paraxylene containing mother liquor, wherein the first stage slurry is filtered to provide a partially purified paraxylene filter cake and a first stage-paraxylene containing filtrate, wherein the thus obtained partially purified first stage paraxylene filter cake is liquefied and chilled to a temperature of about −20° to +20° F. to form a second stage slurry of paraxylene crystals in a mother liquor rich in paraxylene, and wherein the second stage slurry is filtered to provide a second stage filtrate and a second stage filter cake product consisting essentially of paraxylene, the improvement for obtaining a further yield of paraxylene which comprises the steps of mixing about 20 to 45 volume percent of carbon tetrachloride with the first stage filtrate, chilling the thus formed mixture to a temperature of about −90° to −105° F. to form an intermediate slurry of crystalline paraxylene-carbon tetrachloride complex in a carbon tetrachloride containing mother liquor, filtering the intermediate stage filter cake of crystalline paraxylene-carbon tetrachloride complex, melting the thus obtained intermediate stage filter cake, and removing carbon tetrachloride from the thus obtained melt.

9. A process as in claim 8 wherein the feed stock comprises a mixture of isomeric xylenes containing about 10 to 20 weight percent of paraxylene.

10. A process as in claim 9 wherein the first and intermediate stage slurries are maintained at a temperature of about −95° F.

11. A process as in claim 9 wherein the second stage filtrate is recycled to the first stage.

12. A process as in claim 8 wherein the carbon tetrachloride is removed from the intermediate stage filtrate in addition to being removed from the intermediate stage filter cake and wherein the thus removed carbon tetrachloride is recycled.

References Cited in the file of this patent

UNITED STATES PATENTS 2,622,115     Carney _____ Dec. 16, 1952

OTHER REFERENCES

Egan et al.: Ind. and Eng. Chem., vol. 47, No. 2 (February 1955), pages 250–253.